(No Model.)
M. H. MOLLOY.
STEAM ENGINE ATTACHMENT.
No. 532,083. Patented Jan. 8, 1895.
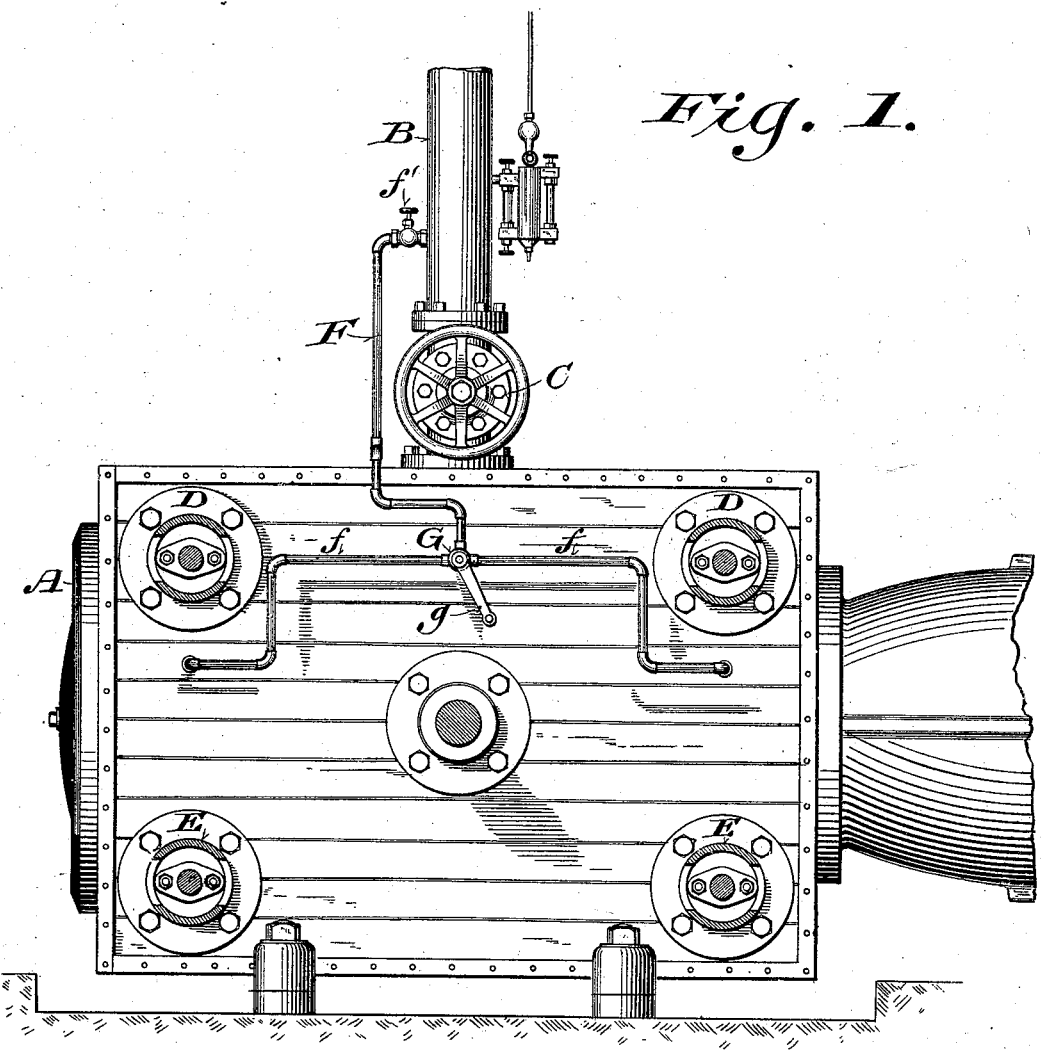
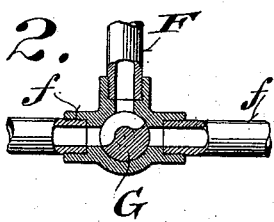
Witnesses:
Geo. W. Young,
Chas. L. Goss.
Inventor:
Michael H. Molloy,
By Wistler Hocker Smith Bothun Ehlen
Attorneys.

UNITED STATES PATENT OFFICE.

MICHAEL H. MOLLOY, OF MILWAUKEE, WISCONSIN.

STEAM-ENGINE ATTACHMENT.

SPECIFICATION forming part of Letters Patent No. 532,083, dated January 8, 1895.

Application filed February 23, 1894. Serial No. 501,093. (No model.)

*To all whom it may concern:*

Be it known that I, MICHAEL H. MOLLOY, of Milwaukee, in the county of Milwaukee and State of Wisconsin, have invented certain new and useful Improvements in Steam-Engine Attachments; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to prevent a vacuum in the end of the cylinder of a steam engine to which steam is admitted when the engine is running with little or no load, and thereby save steam and prevent lifting of the exhaust valves of engines employing independent exhaust valves, from their seats, and the noise and wear incident thereto; to keep up the desired temperature of the cylinder at all times and to facilitate heating it before starting the engine without working the main valve gear.

It consists essentially of the combination with the cylinder, piston and main steam supply pipe of a steam engine, of a by-passage or an auxiliary steam supply pipe and a valve or valves arranged to automatically admit steam from said auxiliary supply pipe alternately into opposite ends of the cylinder on the back or receding side of the piston, and of certain novel features in the construction and arrangement of the component parts of the device hereinafter particularly described and pointed out in the claims.

In the accompanying drawings like letters designate the same parts in both figures.

Figure 1 is a slide elevation of the cylinder and its immediate connections of an automatic cut-off engine of the Corliss type, and Fig. 2 is a sectional view on an enlarged scale of a portion of the device embodying my invention.

I have found by experience in running engines of various kinds that when the load is taken off, and little or no resistance opposed to the movement of the piston, a vacuum is produced in the cylinder at the end to which steam is admitted by the main valve, and the advance movement of the piston is thus resisted and an increase in the quantity of steam corresponding to such resistance is consumed in moving the piston in the opposite direction. In Corliss or automatic cut-off engines employing separate exhaust valves, such valves are lifted from their seats by the formation of such a vacuum on the steam side of the piston, and when steam is admitted on the opposite side and the movement of the piston is reversed, the valves are violently seated, thereby increasing the wear thereof and of the seats in which they work and producing an objectionable noise. By the employment of my improvements I am enabled to avoid these difficulties and objections and to accomplish the objects hereinbefore stated, not only in connection with automatic cut-off engines but with engines employing slide valves and throttling governors.

Referring to the drawings, A represents the cylinder of an ordinary automatic cut-off engine of the Corliss type. B designates the steam pipe connected therewith and provided with a throttle valve C in the usual manner.

D D are the main steam valve connections, and E E the exhaust valve connections, the valve gear by which they are connected and operated, being removed.

F is a steam pipe connected at one end with the steam supply pipe B on the opposite side of the throttle valve C from the cylinder, and at the opposite end by branches *f f* with the ends of the cylinder A. At the junction of the pipe F with its branches *f f*, is a two-way valve G, shown in detail in Fig. 2. It is provided with a crank arm *g* or other suitabe means of connecting it with the wrist plate, rocker arm, eccentric or other convenient moving part of the engine by which the required movement may be imparted to said valve. This valve is so made and connected as to admit steam independently of the control of the governor to whichever end of the cylinder steam is admitted by the main steam admission valve or valves. This valve working independently of the main steam valves, may be adjusted to admit steam during the full stroke of the piston or at any desired point in the stroke, and to close at any point in the stroke. The size of the pipe F and its branches forming a by-passage around the governor connection of the engine, is to be determined according to the size of the cylinder, but in any case will be much smaller than the main steam pipe. For the purpose of admitting steam to and heating both ends of the cylinder when the engine is at rest, without working the main valve gear, the actuating connections of the two-way valve G are arranged to be disconnected so that said valve may be manually operated. The pipe F is provided with a valve $f'$ by which the flow of steam through it may be regulated or entirely cut off.

In applying my invention to engines employing slide valves or throttling governors, such as locomotives, the steam pipe F is attached to the main steam pipe on the opposite side of the main throttle valve from the cylinder, and leads into the steam chest, and the two-way valve G employed in connection with automatic cut-off engines, is dispensed with. When applied to locomotive engines, the valve $f'$ would have an operating connection with the cab whereby it would be brought under easy and constant control of the engineer.

Various changes in the minor details of the device and its connections to adapt it to engines of various kinds, are obviously contemplated as within the spirit and intended scope of my invention.

I claim—

1. In a steam engine, the combination with the cylinder, piston and main steam supply pipe, of a by-passage or an auxiliary steam supply pipe, and a valve or valves arranged to automatically admit steam from said auxiliary supply pipe alternately into opposite ends of the cylinder on the back or receding side of the piston, substantially as and for the purposes set forth.

2. In a steam engine, the combination with the cylinder, piston and main steam supply pipe, of an auxiliary steam supply pipe passing around and independent of the main throttle valve or governor connection of the engine and provided with a manually controlled valve and an automatic valve or valves arranged to admit steam from said auxiliary pipe alternately into opposite ends of the cylinder on the back or receding side of the piston, substantially as and for the purposes set forth.

3. The combination in a steam engine with the cylinder, steam pipe and throttle valve, of a by-passage or pipe, and branches connecting the ends of the cylinder with the steam pipe on the opposite side of the throttle valve, and a two-way valve at the junction of said by-passage or pipe with its branches, substantially as and for the purposes set forth.

4. In a steam engine, the combination with the cylinder, steam pipe and throttle valve, of a by-passage or pipe, and branches connecting the ends of the cylinder with the steam pipe, and a two-way valve at the junction of said by-passage or pipe with its branches, having an actuating connection for attachment to some moving part of the engine, substantially as and for the purposes set forth.

5. In a steam engine, the combination with the cylinder, piston and main supply pipe, of a by-passage or auxiliary steam supply pipe leading to opposite ends of the cylinder independent of the main throttle valve or governor connection of the engine, and an automatic valve or valves connected with and actuated by a moving part of the engine so as to admit steam from said auxiliary pipe alternately into opposite ends of the cylinder on the back or receding side of the piston, substantially as and for the purposes set forth.

In testimony that I claim the foregoing as my own I affix my signature in presence of two witnesses.

MICHAEL H. MOLLOY.

Witnesses:
W. T. WEBER,
CHAS. L. GOSS.